Feb. 11, 1941.  C. ORT  2,231,734

COMBINED VIEW FINDER AND RANGE FINDER

Original Filed May 1, 1937

Inventor
Carl Ort
By Newton M. Perros
Rolla N. Carter
Attorneys

Patented Feb. 11, 1941

2,231,734

UNITED STATES PATENT OFFICE 2,231,734

COMBINED VIEW FINDER AND RANGE FINDER

Carl Ort, Stuttgart, Germany, assignor to Eastman Kodak Company, Rochester, N. Y., a corporation of New Jersey Original application May 1, 1937, Serial No. 140,231. Divided and this application July 25, 1939, Serial No. 286,363. In Germany July 28, 1936

6 Claims. (Cl. 88—2.4)

This is a division of my application Serial Number 140,231, filed May 1, 1937, now Patent No. 2,191,027, issued February 20, 1940, Figures 4, 7, and 8 thereof being reproduced herewith as Figures 1, 2, and 3.

This invention relates to optical systems. It relates to optical systems which include means for deviating a ray of light.

Many devices such as prisms and glass wedges, are well known in the art as means for deviating light rays. It is sometimes desirable to use some such deviating means in an optical system in which lenses are also employed. It is an object of the present invention to provide a simple optical light deviating device which also comprises part of the lens system with which it is used, i. e., an optical device having variable deviating power and constant focal power.

It is a further object of the invention to provide a combination range finder and view finder employing this light deviating means and having means for coupling the light deviating means to the focusing arrangement of the camera with which it is employed and/or means for providing an erect image in the view finder eye-piece when positive lenses only are employed, and/or a particularly simplified lens system which insures that the image seen in the combination view finder range finder has sufficient magnification for range finding purposes and also includes the correct field of view for view finding purposes.

Other objects and advantages of the invention will become apparent from the following description when read in connection with the accompanying drawing in which, Fig. 1 is a perspective view showing a portion of a camera on which is mounted a combined range and view finder incorporating the invention.

Figure 1:
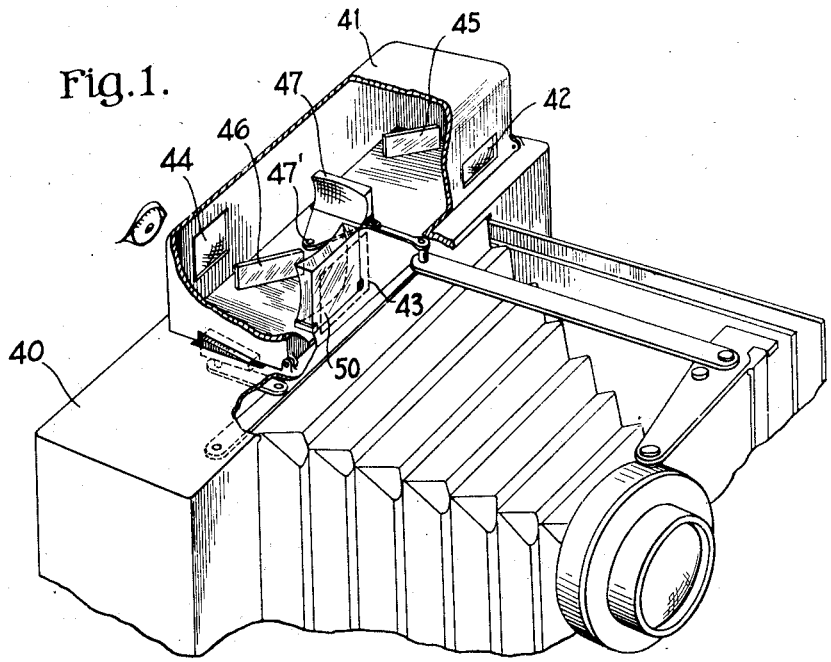

According to the invention, a range finder is provided as shown in Fig. 1 having a simplified light deviating means. The arrangement shown is a combination view finder range finder wherein the direct beam of the range finder wholly constitutes the view finder field, and wherein the range finder light deviating means is coupled to the camera focusing adjustor. However, it is to be understood that this light deviating means may be incorporated in many various types of range finders without departing from the spirit of the invention.

This perspective drawing (Fig. 1) shows part of a camera housing 40 upon which is mounted a range finder 41 whose housing has been partly broken away to show the optical components therein which include two front windows 42 and 43 for transmitting the indirect and direct beams respectively and a rear window or eye-piece 44. In a well-known manner, the indirect beam is reflected by a fixed reflector 45 through a light deviating device 47 to a semi-transparent mirror 46 which reflects it to the eye-piece 44. The direct beam coming through the window 43 passes through a dispersive lens 50 to the eye-piece 44 and a portion of this beam passes through the semi-transparent mirror 46. In accordance with the invention, the light deviating means 47 comprises a plano-concave lens pivotally mounted at 47' to be rotatable about a line through the center of curvature of this surface.

This divisional application is primarily concerned with the view finder comprising the lens 50 and the eye-piece 44.

The combination range finder view finder shown in Fig. 1 has as a view finder, an inverted Galilean telescope. The reflected beam of the range finder also traverses an inverted Galilean telescope wherein the front negative component also constitutes wholly the ray reflecting means.

In a combination view-finder-range-finder of this type there are two requirements which are somewhat conflicting. For range finding purposes it is usually desirable to have as high a magnification as possible. For view finding purposes, it is necessary that the total field of view included be approximately that which is to be photographed. In most optical systems the field of view decreases when the magnification increases.

Figure 2:
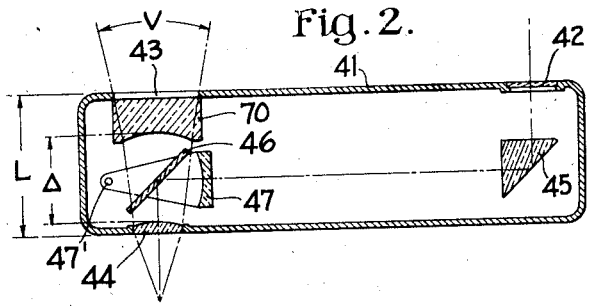
Fig. 2 shows a cross section of a range finder of the type shown in Fig. 1 and including a very simplified and convenient device for increasing the magnification of the image seen therein (to facilitate range finding) without altering the field of view (which must be correct for view finding purposes).
Figure 3:
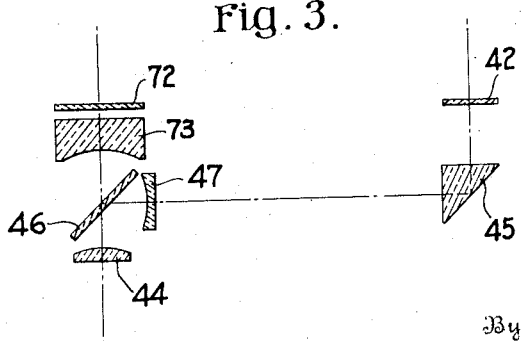
Fig. 3 shows a variation of the embodiment shown in Fig. 2 wherein slight adjustment of one of the optical elements is provided to permit relative focusing of the two fields of the range finder.

According to the invention there is provided a simple and satisfactory form of wide angle, high magnification, system as shown in Figs. 2 and 3. I have found that satisfactory magnification for range finding purposes may be obtained (while the angle, marked V in the figure, which defines the field of view is maintained constant) by using a thick plano-concave lens 70 for the front element of the view finder. It will be apparent to those skilled in the art that the magnification factor increases, i. e. approaches unity, as the distance between the concave surface of the element 70 approaches the convex surface of the eye-piece 44, that is, as the value Δ becomes smaller. As is well known, the power of the concave surface of the element 70 must become less as the value Δ decreases if the combination of the components 70 and 44 is to form an inverted Galilean telescope at all times. However, in this embodiment of the invention, a thick lens 70 is used decreasing the value Δ (i. e. giving higher magnification) but maintaining the field of view as defined by the angle unchanged. Hence, the optical system serves satisfactorily as a view finder. The distance between the front plano surface of the component 70 and the rear plano surface of the eye-piece component 44 is designated as L. I have found that a system in which the ratio of Δ to L is between .5 and .75 gives the most satisfactory results.

Since in view finders of this general type, the eye-piece has negligible thickness, i. e. as shown in Fig. 2, is less than $\frac{1}{10}$ or even $\frac{1}{20}$ of the overall length of the view finder, the above limits for the ratio of Δ to L, mean that the thickness of the front negative element must be between $\frac{1}{3}$ and 1 times the spacing Δ. That is, Δ must be between 1 and 3 times the thickness of the front element 70.

The advantages of this invention are best visualized from the perspective drawing shown as Fig. 1. If, instead of making the front element of the finder very thick, as the rear surface thereof is moved toward the eye-piece 44, the front window 43 would have to become both higher and wider in order that the finder would cover a satisfactory field and this would necessitate either cutting away the camera housing or building the range finder housing 41 very high indeed. Thus my invention provides a simple means for avoiding a cumbersome range finder arrangement.

A similar arrangement is shown in Fig. 3 wherein the plano-concave component 70 is divided into two elements, a plano disk 72 and a plano concave element 73. The plane disk 72 may constitute the front window of the range finder and the plano concave element 73 is made adjustable axially to focus one half of the range finder field relative to the other half, i. e. to adjust the manification of the view finder to match that of the other half of the range finder.

As far as the present invention is concerned, the thickness of the disk 72 may be considered as added to that of the element 73 and the spacing therebetween as added to the spacing between the elements 44 and 73, i. e. added to the spacing Δ.

It is to be understood that any of the lens components in the optical systems shown may, in most cases, be compound to correct for optical aberrations if so desired.

Having thus described the invention, I wish to point out that it is not confined to the specific structures and applications shown but is of the scope of the appended claims.

What I claim and wish to protect by Letters Patent of the United States is:

1. A view finder for cameras consisting of a thin plano convex element as an eye-piece and a relatively thick concave plano front element spaced from the eye-piece a distance between .5 and .75 of the axial length of the view finder, said distance being between one and three times the axial thickness of said front element, the plano surfaces being outward, whereby the finder has simultaneously, a small cross section compared to its length, a high covering power and a magnifying power differing from unity by a relatively small amount.

2. A view finder for cameras consisting of a thin positive element as an eye-piece, a thick negative front element spaced from the eye-piece a distance between one and three times the axial thickness of the front element, all refractive surfaces of the elements being surfaces of revolution about the optic axis of the finder, and a field defining means adjacent to the front element having a rectangular aperture concentric with said optic axis.

3. A view finder for cameras consisting of a thin positive element as an eye-piece, a thick negative front element spaced from the eye-piece a distance equal to about twice the axial thickness of the front element, all refractive surfaces of the elements being surfaces of revolution about the optic axis of the finder, and a field defining means adjacent to the front element having a rectangular aperture concentric with said optic axis.

4. A range finder of the coincidence type employing two optical systems having a thin positive lens as a common eye-piece, one of the systems forming a view finder and consisting of this eye-piece, a thick negative lens spaced in front of the eye-piece a distance between one-half and three-quarters of the overall axial length of said one of the systems, said distance being between one and three times the axial thickness of said negative lens and the refractive surfaces of the eye piece and negative lens being surfaces of revolution about the optic axis of the view finder system, and a field defining means adjacent to said negative lens having a rectangular aperture concentric with said optic axis.

5. A range finder according to claim 4 in which the negative lens is a plano concave element and the positive lens is a convex plano element, the plano surfaces being turned outward.

6. A range finder according to claim 4 in which the negative lens is axially adjustable to adjust the magnification of the view finder.

CARL ORT.